(12) United States Patent
Chan et al.

(10) Patent No.: US 8,648,974 B2
(45) Date of Patent: Feb. 11, 2014

(54) PSA LCD PANEL WITH PIXEL UNIT OF EIGHT DOMAINS

(75) Inventors: Te-Wei Chan, Hsin-Chu (TW); Ya-Chieh Chen, Hsin-Chu (TW); Chung-Yi Chiu, Hsin-Chu (TW); Ting-Wei Su, Hsin-Chu (TW); Yi-Pai Huang, Hsin-Chu (TW); Ting-Jui Chang, Hsin-Chu (TW); Jenn-Jia Su, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 13/344,971

(22) Filed: Jan. 6, 2012

(65) Prior Publication Data

US 2012/0105756 A1 May 3, 2012

Related U.S. Application Data

(63) Continuation of application No. 11/727,115, filed on Mar. 23, 2007, now abandoned.

(30) Foreign Application Priority Data

Aug. 8, 2006 (TW) .............................. 95129118 A

(51) Int. Cl.
*G02F 1/1343* (2006.01)
*G02F 1/1337* (2006.01)

(52) U.S. Cl.
USPC .............. 349/39; 349/38; 349/128; 349/129; 349/144; 349/145

(58) Field of Classification Search
USPC ....................... 349/38–39, 128–129, 144–145
See application file for complete search history.

(56) References Cited

U.S. PATENT DOCUMENTS

| | | | |
|---|---|---|---|
| 2003/0137628 A1* | 7/2003 | Nagaoka | 349/141 |
| 2004/0001167 A1 | 1/2004 | Takeuchi et al. | |
| 2005/0030460 A1 | 2/2005 | Kim et al. | |
| 2006/0092367 A1* | 5/2006 | Shin et al. | 349/144 |
| 2006/0146243 A1* | 7/2006 | Nakanishi et al. | 349/139 |
| 2006/0262237 A1 | 11/2006 | Chen et al. | |
| 2007/0103607 A1 | 5/2007 | Hanaoka et al. | |

FOREIGN PATENT DOCUMENTS

| | | |
|---|---|---|
| CN | 1469175 A | 1/2004 |
| JP | 7-311390 A | 11/1995 |
| TW | 200604986 | 2/2006 |
| TW | 200615627 | 5/2006 |
| TW | 200624917 | 7/2006 |

* cited by examiner

*Primary Examiner* — Lauren Nguyen
(74) *Attorney, Agent, or Firm* — Birch, Stewart, Kolasch & Birch, LLP

(57) ABSTRACT

A PSA LCD panel includes a plurality of pixel units. Each of the pixel units includes a first pixel electrode and a second pixel electrode separated from the first pixel electrode. Each of the first and second pixel electrodes has a pattern scattered from a center in such a manner to form four domains.

9 Claims, 9 Drawing Sheets

PSA LCD PANEL WITH PIXEL UNIT OF EIGHT DOMAINS

CROSS-REFERENCE TO RELATED APPLICATIONS

This application is a continuation of U.S. patent application Ser. No. 11/727,115, filed Mar. 23, 2007 now abandoned, which claims the benefit of Taiwan Patent applications Serial No. 95129118, filed Aug. 8, 2006.

BACKGROUND OF THE INVENTION (1) Field of the Invention

The present invention relates to an LCD panel, and more specifically to a PSA (polymer stabilized alignment) LCD panel.

(2) Description of the Prior Art

Due to rapid development in the display technology, an LCD (liquid crystal display) device is generally preferred to when compared to the conventional CRT-type display device due to its compact size and quick response time in addition to its lower power consumption and low radiation. Therefore, the LCD device is in great demand in the market and is widely used in many electronic devices, such as calculators, PDAs, notebook computers, digital cameras and mobile phones.

Due to market competition, the LCD manufacturers have devoted a tremendous effort in the research to improve the ability of the LCD device and simultaneously lower the cost. Therefore, the demand for the LCD device is increasing. Presently, the research is emphasized in the field how to widen the viewing angle of the LCD panel and shorten the response time for displaying the image.

In order to achieve the aforesaid objects, a MVA (multi-domain vertical alignment) design is implemented in the liquid crystal layer. During the construction of the LCD device, the common electrode and the pixel electrode are formed with protrusions or slits in order to control the splay of the crystal molecules when no voltage is applied on the liquid crystal layer, i.e. the crystal molecules are slightly inclined with respect to the protrusions. Thus, when the voltage is applied onto the pixel electrode, an electric field is generated that forces the crystal molecules in the liquid crystal layer to change their orientation from the slightly inclined direction to a predetermined direction, thereby shortening the response time so as to provide a wide viewing angle.

The multi-domain vertical alignment technology includes a film depositing process, an etching process and a photolithographic process to form the protrusion or slits on the common electrode and the pixel electrode. The production method is relatively complicated and results in the higher manufacturing cost. Moreover, since the protrusions formed on the substrate may hinder passage of light therethrough and the increased quantity thereof consequently reduces the number of the slits, which, in turn, lowers the brightness in the display panel of the LCD device.

The LCD manufacturers have introduced a PSA (polymer stabilized alignment) technology to solve the problems resulted by the use of the MVA (multi-domain vertical alignment) technology in the LCD device.

The LCD device generally includes a liquid crystal layer sandwiched between an upper substrate and a lower substrate. A common electrode is sandwiched between the liquid crystal layer and the upper substrate.

FIG. 1 shows a pixel structure of a conventional PSA LCD panel formed on a lower substrate, and includes a plurality of pixel units 10. Each pixel unit 10 includes a scan line 101, a data line 102, a thin film transistor 103, a storage capacitor 104, and a pixel electrode 105. During the operation, the scan line 101 is capable of transmitting a scan signal through the transistor 103 so as to permit transmission of the voltage signal from the data line 102 to the pixel electrode 105. At the same time, since the voltage signal fed through the data line 102 is retained within the storage capacitor 104, the pixel unit 10 can be kept under a preset gray value during the break of the data transmission.

As illustrated, the pixel electrode 105 includes a pattern having a plurality of parallel ribs extending along four directions (the pattern has a fish-bone configuration). Under the operation, an electric field is resulted between the pixel electrode 105 and the common electrode so as to force the crystal molecules to change their orientation. The crystal molecules change their orientation towards the four directions due to the configuration of the pixel electrode 105 so as to form four domains with respect to the center thereof.

In order to shorten the response time for displaying the image, after the pixel electrode 105 being constructed as the aforesaid manner, the PSA (polymer stabilized alignment) technology is implemented onto the pixel electrode 105 so as to direct the crystal molecules within the liquid crystal layer in a predetermined inclined angle. In other words, during construction of the aforesaid PSA LCD panel, the monomers are added into the liquid crystal layer such that when the voltage signal is applied onto the common electrode and the pixel electrode 105, the crystal molecules tend in the predetermined inclined angle with the monomers tending the same direction. A power light (visible or ultra violet light) or heat treatment is conducted such that the monomers combined together to form the polymers tending in the predetermined inclined angle.

When no voltage is applied, the crystal molecules tend in the predetermined inclined angle under the influence of the polymers. When driven by an electric field, the crystal molecules can turn swiftly from the predetermined inclined angle into the appropriate position, thereby shortening the response time for displaying the image.

Moreover, since the PSA LCD panel is not provided with the protrusions or slits, it is free from light leakage problem when compared to the MVA LCD panel. Thus, the PSA LCD panel has a high contrast and a higher brightness than the MVA LCD panel.

Presently, the pixel electrode 105 in the PSA LCD panel is made from ITO (indium tin oxide). Lithographic and etching processes are conducted to form the pattern with a fish-bone configuration having a plurality of parallel ribs divided in four domains with respect to a center, which, in turn, provides a higher contrast, a higher brightness and a shorter response time. However, it is in the trend to produce the LCD panel in a larger dimension, the aforesaid design is unable to solve the color-shift in the changing view angle and reduce the color washout phenomenon.

SUMMARY OF THE INVENTION

The object the present invention is to provide a PSA (polymer stabilized alignment) technology for constructing an LCD panel. By designing the pixel electrode, the transistor, the crystal capacitor and the storage capacitor within each pixel unit of the LCD panel, the pattern of the pixel unit can be divided into eight domains instead of four domains. Once, the pattern is thus arranged, the wide viewing and color washout phenomenon is greatly improved.

In one aspect of the present invention, a PSA (polymer stabilized alignment) LCD panel is provided and includes a plurality of pixel units. Each pixel unit includes a first pixel electrode and a second pixel electrode separated from the first pixel electrode. Each of the first and second pixel electrodes has a pattern scattered from a center in such a manner to form four domains.

In a second aspect of the present invention, a PSA (polymer stabilized alignment) LCD panel is provided and includes a plurality of pixel units. Each pixel unit includes a scan line, a data line, a first transistor, a first crystal capacitor, a first storage capacitor, a second crystal capacitor and a second crystal capacitor.

The scan line is used for transmitting a scan signal. The data line is used for transmitting a voltage signal. The first transistor is adapted to be switched on in response to the scan signal for transmitting the voltage signal. The first crystal capacitor is formed by a first pixel electrode, a crystal layer and a first common electrode, and is further coupled to the first transistor for receiving the voltage signal. The first storage capacitor is formed by a first capacitor electrode, a first dielectric layer and a second common electrode, and is coupled to the first crystal capacitor in parallel and coupled to the first transistor for receiving the voltage signal.

The second crystal capacitor is formed by a second pixel electrode, the crystal layer and the first common electrode. The second crystal capacitor is coupled to the data line, wherein the first and second pixel electrodes are separated from each other. The second storage capacitor is formed by a second capacitor electrode, the first dielectric layer and a third common electrode, and is coupled to the second crystal capacitor in parallel.

These and other objectives of the present invention will no doubt become obvious to those of ordinary skill in the art after reading the following detailed description of the preferred embodiment, which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

An LCD panel of the present invention is constructed by using PSA (polymer stabilized alignment) technology. A pixel unit of the LCD panel includes a pattern, which can be divided into several domains so as to enhance the viewing angle and improve the color washout problem.

Figure 1:
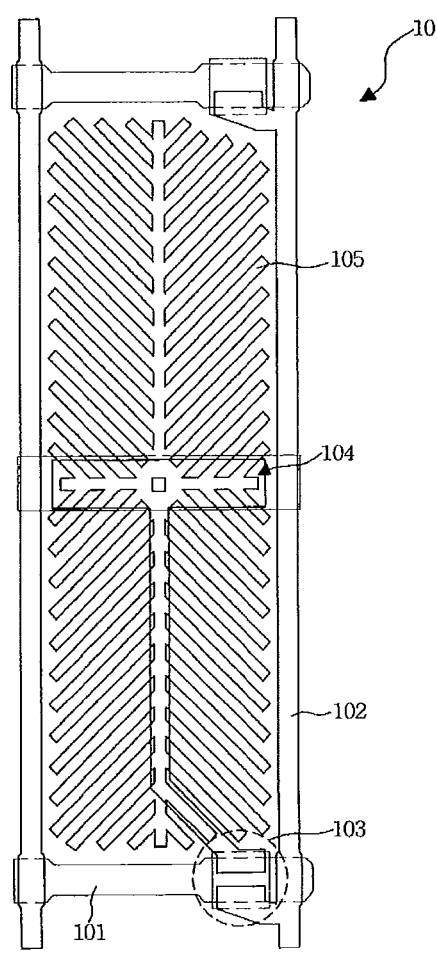
FIG. 1 is a top view of a pixel unit in a conventional PSA (polymer stabilized alignment) LCD panel.
Figure 2:
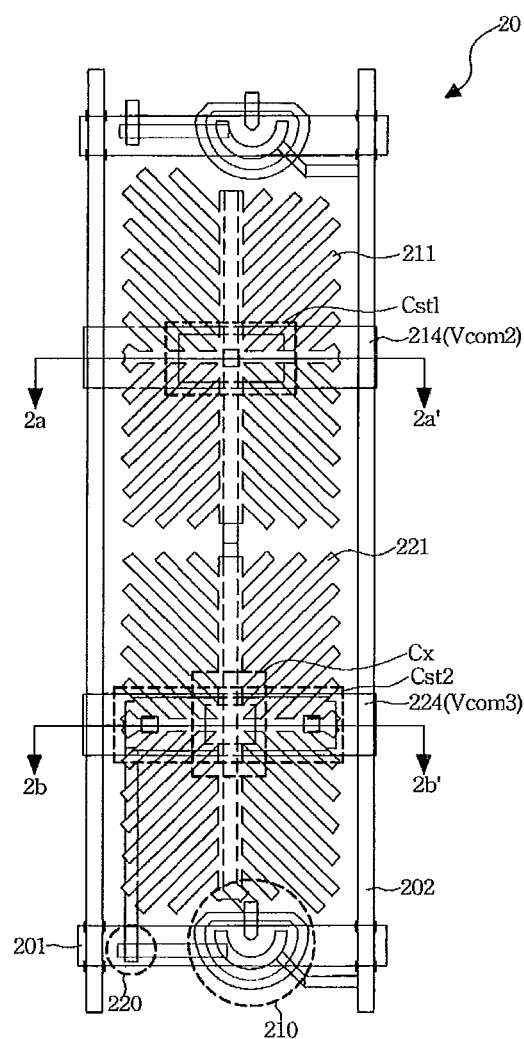
FIG. 2 is a top view of the first embodiment of a pixel unit in a PSA (polymer stabilized alignment) LCD panel according to the present invention.
Figure 3:
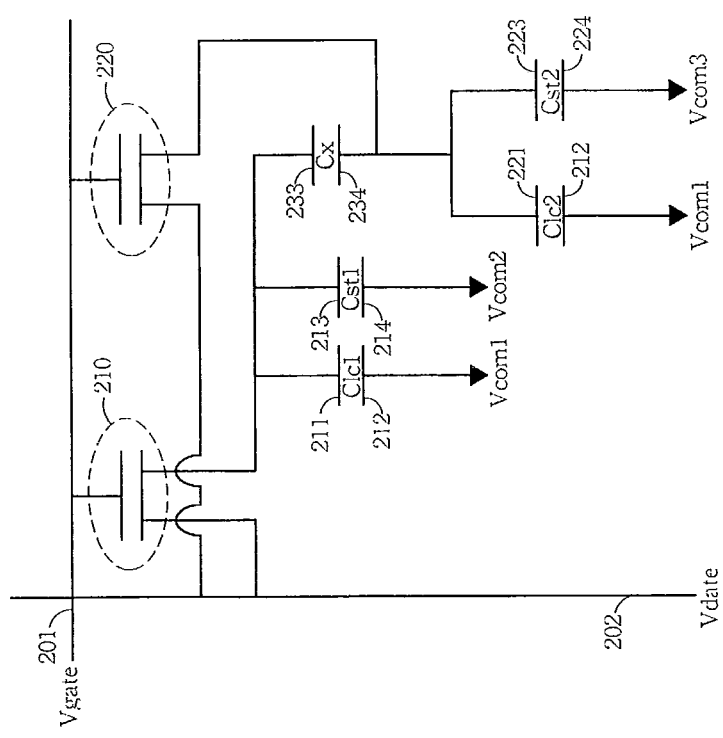
FIG. 3 illustrates a circuit diagram representing the first embodiment shown in FIG. 2.
Figure 4:
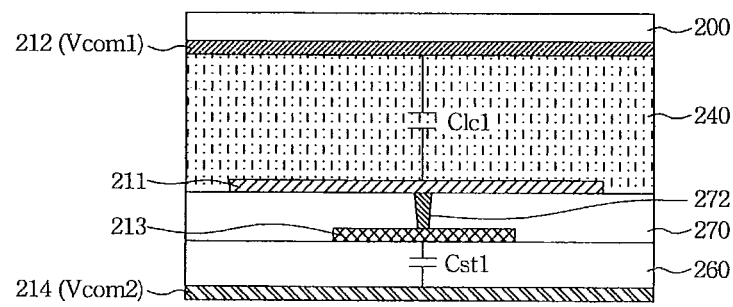
FIG. 4A is a cross-sectional view of the first embodiment taken along the line 2a-2a' in FIG. 2.
FIG. 4B is a cross-sectional view of the first embodiment taken along the line 2b-2b' in FIG. 2.
Figure 4:
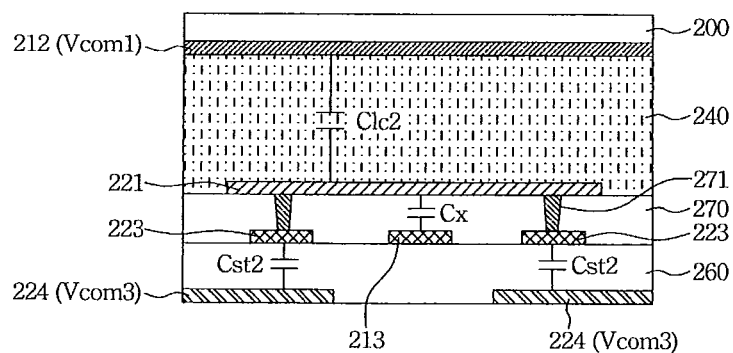

The PSA (polymer stabilized alignment) LCD panel of the present invention includes a plurality of pixel units 20, an upper substrate provided with a color filter and a lower substrate provided with thin film transistors (TFT). FIG. 2 is a top view of the first embodiment of a pixel unit in the PSA LCD panel according to the present invention. FIG. 3 illustrates a circuit diagram representing the first embodiment shown in FIG. 2. FIG. 4A is a cross-sectional view of the first embodiment taken along the line 2a-2a' in FIG. 2. FIG. 4B is a cross-sectional view of the first embodiment taken along the line 2b-2b' in FIG. 2. As illustrated, each pixel unit 20 includes a scan line 201, a data line 202, a first transistor 210, a first crystal capacitor Clc1, a first storage capacitor Cst1, a second crystal capacitor Clc2 and a second storage capacitor Cst2.

The scan line 201 is used for scanning and transmitting a scan signal. The data line 202 is used for transmitting a voltage signal. The first transistor 210 is adapted to be switched on in response to the scan signal for transmitting the voltage signal to the first pixel electrode 211. The first pixel electrode 211 is coupled directly to the first transistor 210 in order to receive the voltage signal.

The first crystal capacitor Clc1 is formed by the first pixel electrode 211, a crystal layer 240 and a first common electrode 212. The first crystal capacitor Clc1 is coupled to the first transistor 210 for receiving the voltage signal. Note that the first common electrode 212 is formed on the upper substrate 200.

The first storage capacitor Cst1 is formed by a first capacitor electrode 213, a first dielectric layer 260 and a second common electrode 214. The first storage capacitor Cst1 is further coupled to the first crystal capacitor Clc1 in parallel and coupled to the first transistor 210 for receiving the voltage signal. As illustrated in FIG. 2, the first transistor 21 has a gate coupled to the scan line 201, a source/drain terminal coupled to the data line 202 and another source/drain terminal coupled to the first pixel electrode 211 and the first capacitor electrode 213.

The second crystal capacitor Clc2 is formed by a second pixel electrode 221, a liquid crystal layer 240 and the first common electrode 212. The second crystal capacitor Clc2 is further coupled to the data line 202, wherein the first and second pixel electrode 211, 221 are separated from each other and are disconnected electrically. The second storage capacitor Cst2 is formed by the second capacitor electrode 223, the first dielectric layer 260 and a third common electrode 224. The second storage capacitor Cst2 is further coupled to the second crystal capacitor Clc2 in parallel.

Referring again to FIGS. 4A and 4B, each pixel unit 20 further includes a second dielectric layer 270 sandwiched between the respective pixel electrode and the respective capacitor electrode, namely between the liquid crystal layer 240 and the first dielectric layer 260.

In the aforementioned PSA LCD panel, the first and second pixel electrodes 211, 221 of the respective pixel unit 20 are separated from each other. Each of the first and second pixel electrodes 211, 221 has a pattern scattered from a center in such a manner to form four domains. Each of the four domains of a respective one of the first and second pixel electrodes 211, 221 includes a plurality of parallel ribs extending in a predetermined direction.

Preferably, the parallel ribs in the four domains define (four azimuth angles) with respect to a line passing through the center ranging of 40 to 50 degrees, 130 to 140 degrees, 220 to 230 degrees and 310 to 320 degrees, respectively. Therefore, the pattern of each of the first and second pixel electrodes 211, 221 in the pixel unit 20 has a fish-bone configuration.

Referring to FIGS. 2 and 3, the pixel unit 20 further includes a coupling capacitor Cx connected between the first transistor 210 and the second crystal capacitor Clc2. The coupling capacitor Cx is formed by a first electrode 233 coupled to a source/drain terminal of the first transistor 210 and a second electrode 234 connected to the second pixel electrode 221 and the second capacitor electrode 223. Coupling capacitor Cx can be controlled to create plural domains, such as at least four domains while second transistor 220 doesn't exist.

FIG. 4B illustrates one embodiment of the formation of the coupling capacitor Cx, wherein the first capacitor electrode 213 serves as the first electrode 233 of the coupling capacitor Cx while the second pixel electrode 221 serves as the second electrode 234 of the coupling capacitor Cx. Therefore, the coupling capacitor Cx is formed by the second pixel electrode 221, the second dielectric layer 270 and the first capacitor electrode 213. Two second capacitor electrodes 223 are coupled electrically to the second pixel electrode 221 via two conducting holes 271 formed through the second dielectric layer 270. The first capacitor electrode 213 is coupled electrically to the first pixel electrode 211 via another conducting hole 272 formed through the second dielectric layer 270, as best shown in FIG. 4A.

As mentioned above, since the first pixel electrode 211 is directly coupled to the first transistor 210, the coupling capacitor Cx is connected to the first crystal capacitor Clc1 in parallel and the second pixel electrode 221 is coupled via the coupling capacitor Cx to the first transistor 210. Under this condition, two different voltages can be applied onto the first and second pixel electrodes 211, 221 respectively via the coupling capacitor Cx such that the first and second pixel electrodes 211, 221 have voltage levels different from each other. In other words, since the first and second crystal capacitors Clc1, Clc2 are connected to each other via the coupling capacitor Cx, the first and second storage capacitors Cst1, Cst2 have different voltages.

When the pixel unit 20 is under the operation, the first pixel electrode 211 possesses the voltage level equivalent to the voltage signal supplied by the data line 202 and the voltage level of the second pixel electrode 221 is supplied by the coupling capacitor Cx. Adjusting the capacitance of the coupling capacitor Cx can vary the voltage level of the second pixel electrode 221, therefore at least four domains can be created.

Since the first and second pixel electrodes 211, 221 have different voltage levels and are located on the same side of the crystal layer 240 at different domains, the orientation of the crystal molecules at the different domains differs from each other under the influence of the electric fields with differing strength. The increased domains of the pattern of the first and second pixel electrodes 211, 22 from four to eight domains magnificently lower the color-shift in the changing view angle and the washout phenomenon, which, in turn, provides a better display ability.

In addition, the pixel unit 20 further includes a second transistor 220. A transistor with a lower charging ability can be selected for serving the second transistor 220. The second transistor 220 has a gate coupled to the scan line 201 and source/drain terminals coupled respectively to the data line 202 and the second pixel electrode 221. The second transistor 220 is adapted to be switched on in response to the scan signal to establish a communication between the data line 202 and the second pixel electrode 221 so as to enable the second transistor 220 to discharge the accumulated charge from the second pixel electrode 221 via the scan line 201. Thus, no image-sticking phenomenon is occurred.

Figure 5:
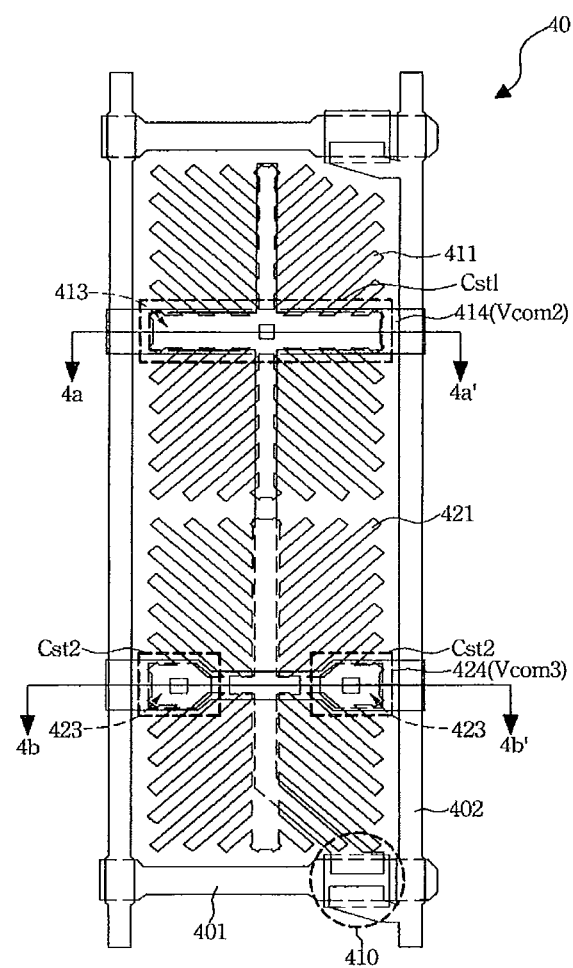
FIG. 5 is a top view of the second embodiment of the pixel unit in the PSA (polymer stabilized alignment) LCD panel according to the present invention.
Figure 6:
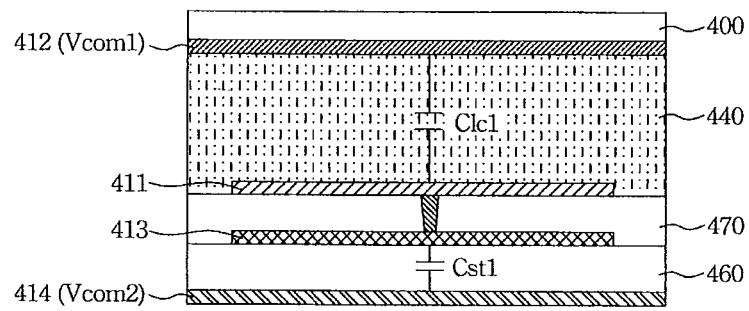
FIG. 6A is a cross-sectional view of the second embodiment taken along the line 4a-4a' in FIG. 5.
FIG. 6B is a cross-sectional view of the second embodiment taken along the line 4b-4b' in FIG. 5.
Figure 6:
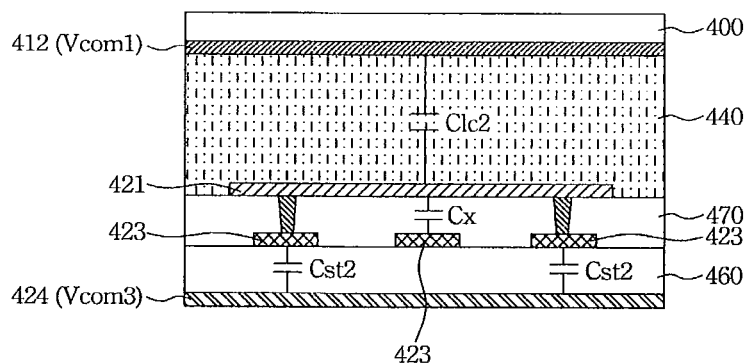

FIG. 5 is a top view of the second embodiment of the pixel unit in the PSA (polymer stabilized alignment) LCD panel according to the present invention. FIG. 6A is a cross-sectional view of the second embodiment taken along the line 4a-4a' in FIG. 5. FIG. 6B is a cross-sectional view of the second embodiment taken along the line 4b-4b' in FIG. 5.

Each pixel unit 40 of the PSA LCD panel includes a scan line 401, a data line 402, a first transistor 410, a first crystal capacitor Clc1, a first storage capacitor Cst1, a second crystal capacitor Clc2 and a second storage capacitor Cst2.

The pixel unit 40 generally has the structure similar to the first embodiment, and has first and second pixel electrodes 411, 421 separated from each other. Referring to FIG. 5, each of the first and second pixel electrodes 411, 421 has a pattern scattered from a center in such a manner to form four domains. Each of the four domains of a respective one of the first and second pixel electrodes 411, 421 includes a plurality of parallel ribs extending in the predetermined inclined direction.

In the above embodiment, the first crystal capacitor Clc1 is formed by the first pixel electrode 411, the crystal layer 440 and the first common electrode 412, wherein the first common electrode 412 is formed on the upper substrate 400. The first storage capacitor Cst1 is formed by a first capacitor electrode 413, the first dielectric layer 460 and the second common electrode 414. The first storage capacitor Cst1 is coupled to the first crystal capacitor Clc1 in parallel while the second common electrode 414 is formed on the lower substrate (not shown).

The second crystal capacitor Clc2 is formed by the second pixel electrode 421, the liquid crystal layer 440 and the first common electrode 412. The second storage capacitor Cst2 is formed by the second capacitor electrode 423, the first dielectric layer 460 and the third common electrode 424. The second storage capacitor Cst2 is further coupled to the second crystal capacitor Clc2 in parallel.

Referring to FIG. 6A and FIG. 6B, the pixel unit 40 further includes the second dielectric layer 470 sandwiched between the respective pixel electrode and the respective capacitor electrode, namely between the liquid crystal layer 440 and the first dielectric layer 460. The second capacitor electrode 423 is coupled to the second pixel electrode 421 via two conducting holes formed through the second dielectric layer 470 while the first capacitor electrode 413 is coupled to the first pixel electrode 411 via another conducting hole formed through the second dielectric layer 470.

The first and second storage capacitors Cst1, Cst2 are coupled respectively to the first and second crystal capacitors Clc1 and Clc2 in parallel. The first capacitor electrode 413 of the first storage capacitor Cst1 and the second capacitor electrode 423 of the second storage capacitor Cst2 are coupled to the data line 402 via the first transistor 410. Two different voltages Vcom2, Vcom3 are respectively applied onto the second common electrode 414 of the first storage capacitor Cst1 and the third common electrode 424 of the second storage capacitor Cst2 such that the first and second storage capacitors Cst1, Cst2 have voltage levels different from each other.

In the second embodiment, since the first and second storage capacitors Cst1 and Cst2 have different voltage levels, when the pixel unit 40 is under the operation, the first pixel electrode 411 and the second pixel electrode 421 may receive the voltage levels different from each other so as to result in two electric fields with differing strength. Thus, the orientation of the crystal molecules at the different domains differs from each other under the influence of the different electric fields.

Each of the first and second pixel electrodes 411, 421 has a pattern scattered from a center in such a manner to form four domains. The increased domains of the pattern in each of the first and second pixel electrodes 411, 421 from four to eight domains magnificently lower the color-shift in the changing view angle and the washout phenomenon, which, in turn, provides a better display ability.

In addition, by applying two different voltage levels Vcom2, Vcom3 respectively on the second and third common electrodes 414, 424, the voltage and the strength of the electric fields at the first and second pixel electrodes 411, 421 can be controlled and adjusted so as to reduce the DC biasing on the first and second pixel electrodes 411, 421, and thereby to reduce the image-sticking phenomenon.

Figure 7:
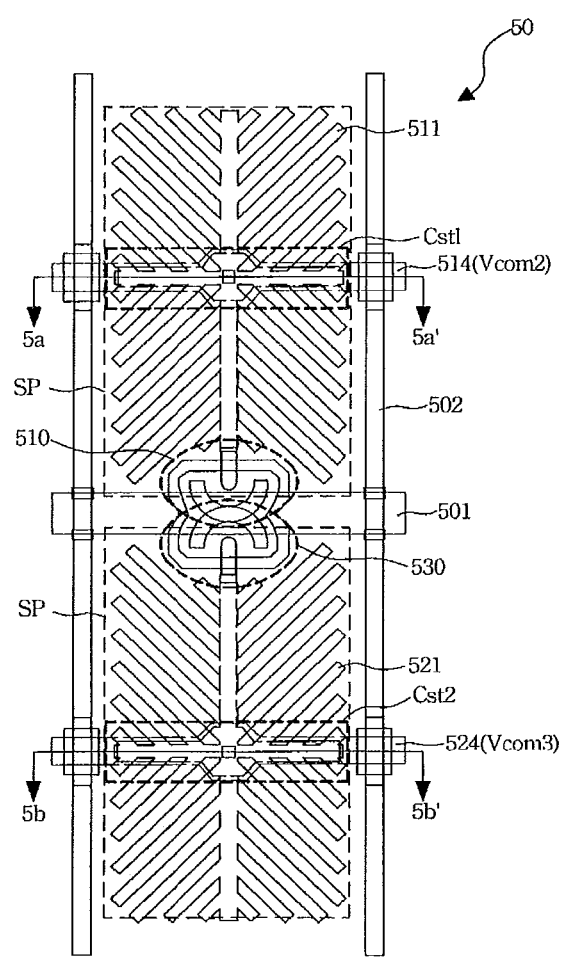
FIG. 7 is a top view of the third embodiment of the pixel unit in the PSA (polymer stabilized alignment) LCD panel according to the present invention.
Figure 8:
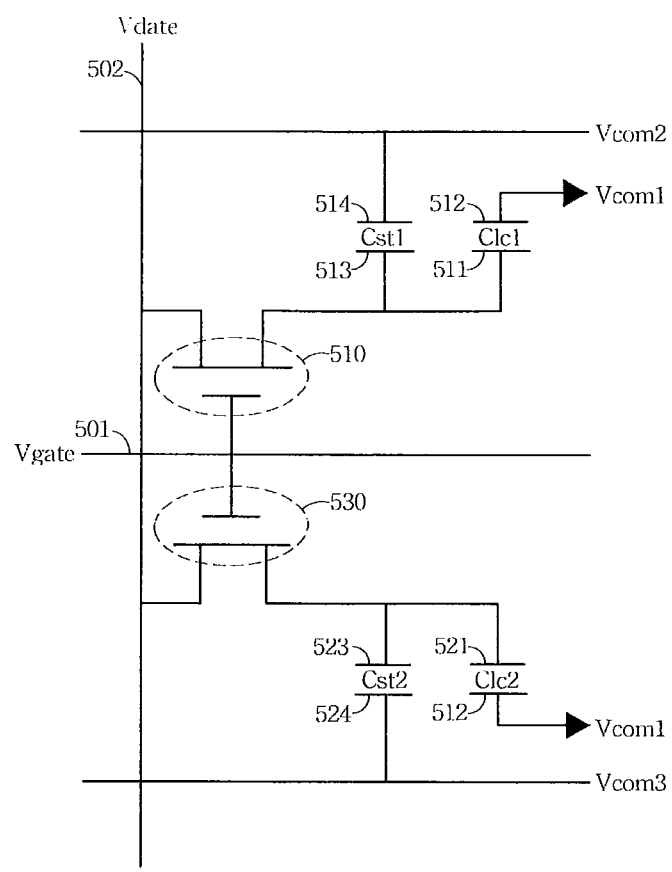
FIG. 8 illustrates a circuit diagram representing the third embodiment shown in FIG. 7.
Figure 9:
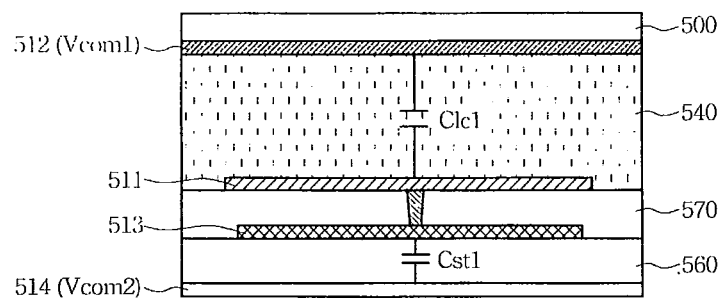
FIG. 9A is a cross-sectional view of the third embodiment taken along the line 5a-5a' in FIG. 7.
FIG. 9B is a cross-sectional view of the third embodiment taken along the line 5b-5b' in FIG. 7.
Figure 9:
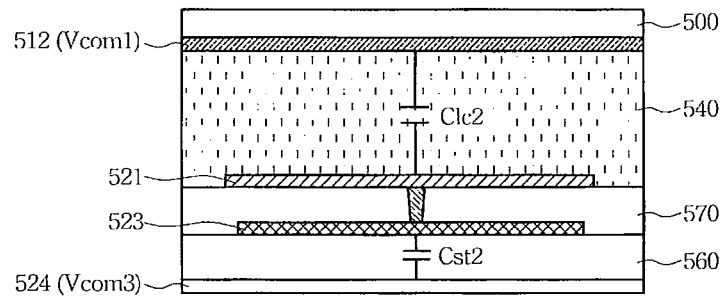

FIG. 7 is a top view of the third embodiment of the pixel unit in the PSA (polymer stabilized alignment) LCD panel according to the present invention. FIG. 8 illustrates a circuit diagram representing the third embodiment shown in FIG. 7. FIGS. 9A and 9B are cross-sectional views of the third embodiment taken along the line 5a-5a' and the line 5b-5b' in FIG. 7.

As illustrated, each pixel unit 50 can be divided into two subpixels. The pixel unit 50 includes a scan line 501, a data line 502, a first transistor 510, a third transistor 530, a first crystal capacitor Clc1, a first storage capacitor Cst1, a second crystal capacitor Clc2 and a second storage capacitor Cst2.

The scan line 501 is used for transmitting a scan signal. The data line 502 is used for transmitting a voltage signal. The first transistor 510 is adapted to be switched on in response to the scan signal for transmitting the voltage signal to the first pixel electrode 511. The second transistor 520 is adapted to be switched on in response to the scan signal so as to transmit the voltage signal to the second pixel electrode 521. In one preferred embodiment, the first and second pixel electrodes 511, 521 are coupled directly and respectively to the first and third transistor 510, 530 in order to receive the voltage signal.

The first crystal capacitor Clc1 is formed by the first pixel electrode 511, the crystal layer 540 and the first common electrode 512. The first crystal capacitor Clc1 is coupled to the first transistor 510 for receiving the voltage signal. It is noted that the first common electrode 512 is formed on the upper substrate 500.

The first storage capacitor Cst1 is formed by the first capacitor electrode 513, the first dielectric layer 560 and the second common electrode 514. The first storage capacitor Cst1 is coupled to the first crystal capacitor Clc1 in parallel and coupled to the first transistor 510 for receiving the voltage signal. As illustrated in FIG. 7, the first transistor 510 has a gate coupled to the scan line 501, a source/drain terminal coupled to the data line 502 and another source/drain terminal coupled to the first pixel electrode 511 and the first capacitor electrode 513.

The second crystal capacitor Clc2 is formed by the second pixel electrode 521, the liquid crystal layer 540 and the first common electrode 512. The second crystal capacitor Clc2 is further coupled to the data line 502, wherein the first and second pixel electrode 511, 521 are separated from each other and are disconnected directly.

The second storage capacitor Cst2 is formed by the second capacitor electrode 523, the first dielectric layer 560 and the third common electrode 524. The second storage capacitor Cst2 is further coupled to the second crystal capacitor Clc2 in parallel. As illustrated in FIG. 7, the third transistor 530 has a gate coupled to the scan line 501, a source/drain terminal coupled to the data line 502 and another source/drain coupled to the second pixel electrode 521 and the second capacitor electrode 523. In other words, the third transistor 530 is adapted to be switched on in response to the scan signal so as to transmit the voltage signal from the data line 502 to the second crystal capacitor Clc2 and the second storage capacitor Cst2.

Referring to FIG. 9A and FIG. 9B, the pixel unit 50 further includes the second dielectric layer 570 sandwiched between the respective pixel electrode and the respective capacitor electrode, namely between the liquid crystal layer 540 and the first dielectric layer 560. The first capacitor electrode 513 is coupled to the first pixel electrode 511 via a conducting hole formed through the second dielectric layer 570 while the second capacitor electrode 523 is coupled to the second pixel electrode 521 via another conducting hole formed through the second dielectric layer 570.

Therefore, in the third embodiment, the pixel unit 50 includes two subpixels SP, each of the subpixels is formed by a transistor, a crystal capacitor and a storage capacitor separated from one another.

It is noted that the pixel unit 50 of the PSA LCD panel has first and second pixel electrodes 511, 521 separated from each other. Referring to FIG. 7, each of the first and second pixel electrodes 511, 521 has a pattern scattered from a center in such a manner to form four domains. Each of the four domains of a respective one of the first and second pixel electrodes 511, 521 includes a plurality of parallel ribs extending in the predetermined inclined direction.

In each pixel unit, the first and second transistors 510, 520 are adapted to be switched on in response to the scan signal so as to permit the voltage signal to be transmitted from the data line 502 to the first and second pixel electrodes 511, 521, thereby driving the respective display domains. At this time, since different voltage levels Vcom2, Vcom3 can be applied respectively on the second common electrode 514 of the first storage capacitor Cst1 and the third common electrode 524 of the second storage capacitors Cst2, the two subpixels SP may have voltage levels different from each other.

Once the scan line 501 ceases to transmit the scan signal, the voltage levels Vcom2, Vcom3 of the second and third common electrodes 514, 524 can be adjusted in order to form a periodic oscillation, thereby in each of the subpixels SP such that the inclination angle of the crystal molecules in one subpixel SP is different from that of another subpixel SP.

Moreover, the increased domains of the pattern of the first and second pixel electrodes 511, 522 from four to eight domains magnificently lower the color-shift in the changing view angle and the washout phenomenon, which, in turn, provides a better display ability.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A PSA (polymer stabilized alignment) LCD panel comprising:
    a plurality of pixel units, each of said pixel units including a first pixel electrode and a second pixel electrode separated from said first pixel electrode, wherein the first pixel electrode has a first pattern scattered from a center to form four domains in a first pixel area, and the second pixel electrode has a second pattern scattered from a center to form four domains in a second pixel area,
    wherein each of said pixel units further includes a first transistor, and both the first and second pixel electrodes are connected to a data line through the first transistor,
    wherein each of said pixel units further includes first and second storage capacitors that are electrically connected respectively to said first and second pixel electrodes in parallel, and said first and second storage capacitors have first ends respectively electrically connected to said data line via said first transistor and two second ends being separated electrically from each other for respectively receiving two different voltages such that said first and second storage capacitors have different voltage levels,
    wherein the first end of the first storage capacitor has a portion overlapping with both of the first pattern and the second pattern, and wherein the portion extends from the first pixel area to the second pixel area to form a coupling capacity electrode within the second pixel area, wherein a coupling capacity is formed by the coupling capacity electrode and the second pixel electrode and a dielectric layer therebetween, and the second storage capacitor and the coupling capacity are completely within the second pixel area.

2. The PSA LCD panel according to claim 1, wherein each of said pixel units further includes a third transistor adapted to be switched on in response to said scan signal for transmitting said voltage signal, said second pixel electrode being connected directly said third transistor for receiving said voltage signal.

3. A PSA (polymer stabilized alignment) LCD panel comprising:
    a first common electrode;
    a second pixel electrode separated from the first common electrode, wherein the second pixel electrode has a second pattern scattered from a center to form four domains in a second pixel area;
    a first pixel electrode, wherein the first pixel electrode has a first pattern scattered from a center to form four domains in a first pixel area;
    a liquid crystal layer disposed between the first common electrode and the first pixel electrode, wherein the first pixel electrode, the liquid crystal layer and the first common electrode form a first liquid crystal capacitor, and wherein the second pixel electrode, said liquid crystal layer and said first common electrode form a second liquid crystal capacitor;
    a scan line for transmitting a scan signal;
    a data line for transmitting a voltage signal;
    a first transistor adapted to be switched on in response to said scan signal for transmitting said voltage signal, wherein the first pixel electrode is electrically connected to said first transistor for receiving said voltage signal;
    a first capacitor electrode electrically connected to the first transistor for receiving said voltage signal, wherein the first capacitor electrode has a portion overlapping with both of the first pattern and the second pattern, and wherein the portion extends from the first pixel area to the second pixel area to form a coupling capacity electrode within the second pixel area;
    a second common electrode;
    a first dielectric layer disposed between the first capacitor electrode and the second common electrode, wherein the first capacitor electrode, the second common electrode and the first dielectric layer form a first storage capacitor being coupled to said first liquid crystal capacitor in parallel;
    a second capacitor electrode;
    a second dielectric layer located between the second pixel electrode and the second capacitor electrode;
    a coupling capacity formed by the coupling capacity electrode, the second dielectric layer and the second pixel electrode; and
    a third common electrode, separated electrically from the second common electrode, wherein the second capacitor electrode, the first dielectric layer and the third common electrode form a second storage capacitor being coupled to said second liquid crystal capacitor in parallel, wherein both the first and second pixel electrodes are connected to the data line through the first transistor, and wherein the second storage capacitor and the coupling capacity are completely within the second pixel area.

4. The PSA LCD panel according to claim 3, wherein different voltage levels are applied onto said second and third common electrodes such that said first and second storage capacitors have voltage levels different from each other.

5. The PSA LCD panel according to claim 3, further comprising a third transistor adapted to be switched on in response to said scan signal for transmitting said voltage signal on said data line to said second crystal capacitor and said second storage capacitor.

6. The PSA LCD panel according to claim 5, wherein said third transistor has a gate coupled to said scan line, a source/drain terminal coupled to said data line and another source/drain terminal coupled to said second pixel electrode and said second capacitor electrode.

7. The PSA LCD panel according to claim 3, wherein said first transistor has a gate coupled to said scan line, a source/drain terminal coupled to said data line and another source/drain terminal coupled to said first pixel electrode and said first capacitor electrode.

8. A PSA (polymer stabilized alignment) LCD panel comprising:
    an upper substrate;
    a first pixel electrode having a first pattern scattered from a center to form four domains in a first pixel area;
    a second pixel electrode having a second pattern scattered from a center to form four domains in a second pixel area;
    a liquid crystal layer disposed between the upper substrate and the first pixel electrode;
    a scan line for transmitting a scan signal;
    a data line for transmitting a voltage signal;
    a first transistor adapted to be switched on in response to said scan signal for transmitting said voltage signal;
    a first capacitor electrode electrically connected to the first transistor, wherein the first capacitor electrode has a portion overlapping with both of the first pattern and the second pattern, and wherein the portion extends from the first pixel area to the second pixel area to form a coupling capacity electrode within the second pixel area;
    a second capacitor electrode;
    a dielectric layer located between the second pixel electrode and the second capacitor electrode; and
    a coupling capacity formed by the coupling capacity electrode, the dielectric layer and the second pixel electrode.

9. The PSA LCD panel according to claim 8, wherein the coupling capacity is completely within the second pixel area.

* * * * *